(12) United States Patent
Archambeau et al.

(10) Patent No.: US 10,920,145 B2
(45) Date of Patent: Feb. 16, 2021

(54) METHOD FOR OBTAINING A MATERIAL COMPRISING A LIQUID CRYSTAL MIX WITH A STABILIZED BLUE PHASE AND OPTICAL ARTICLE COMPRISING THIS MATERIAL

(71) Applicant: Essilor International, Charenton-le-Pont (FR)

(72) Inventors: Samuel Archambeau, Charenton-le-Pont (FR); Jean-Paul Cano, Charenton-le-Pont (FR); Sebastian Guaza, Oviedo, FL (US)

(73) Assignee: Essilor International, Charenton-le-pont (FR)

( * ) Notice: Subject to any disclaimer, the term of this patent is extended or adjusted under 35 U.S.C. 154(b) by 0 days.

(21) Appl. No.: 15/742,150

(22) PCT Filed: Jul. 6, 2016

(86) PCT No.: PCT/EP2016/066049
§ 371 (c)(1),
(2) Date: Jan. 5, 2018

(87) PCT Pub. No.: WO2017/005823
PCT Pub. Date: Jan. 12, 2017

(65) Prior Publication Data
US 2018/0237694 A1    Aug. 23, 2018

(30) Foreign Application Priority Data
Jul. 8, 2015  (EP) .................................... 15175947

(51) Int. Cl.
*C09K 19/02* (2006.01)
*C09K 19/20* (2006.01)
(Continued)

(52) U.S. Cl.
CPC .......... *C09K 19/0275* (2013.01); *C09K 19/12* (2013.01); *C09K 19/18* (2013.01);
(Continued)

(58) Field of Classification Search
None
See application file for complete search history.

(56) References Cited

U.S. PATENT DOCUMENTS

2006/0066947 A1*  3/2006  Henry ................... G02B 5/305
                                                     359/487.02
2007/0182915 A1*  8/2007  Osawa .................... G02B 3/08
                                                     349/201
(Continued)

FOREIGN PATENT DOCUMENTS

EP        2774968       9/2014
JP     2006-299084     11/2006
(Continued)

OTHER PUBLICATIONS

Ramsey et al., "Holographically recorded reverse-mode transmission gratings in polymer-dispersed liquid crystal cells", Sep. 10, 2008, Applied Physics B: Lasers and Optics, vol. 93, 481-489. (Year: 2008).*
(Continued)

*Primary Examiner* — Chanceity N Robinson
*Assistant Examiner* — Anna Malloy
(74) *Attorney, Agent, or Firm* — Oblon, McClelland, Maier & Neustadt, L.L.P.

(57) ABSTRACT

A method for obtaining a material containing mesogenic compounds forming a liquid crystal mix with a stabilized blue phase. The method includes the steps of a) inducing the liquid crystal mix, contained in a chemical composition, to form the blue phase, then b) illuminating the chemical composition with a light beam of visible wavelength in order (Continued)

to trigger the polymerization of monomers contained in the chemical composition, to obtain the material comprising the liquid crystal mix in the blue phase stabilized by the polymerized monomers. The chemical composition contains a mesogenic system and a chemical photo-initiator system adapted to trigger the polymerization of the monomers when illuminated by the light beam of visible wavelength, in which the mesogenic system includes the mesogenic compounds forming the liquid crystal mix, a chiral dopant adapted to induce the blue phase, and a monomer mix comprising the monomers adapted to polymerize.

15 Claims, 1 Drawing Sheet

(51) Int. Cl.
    *C09K 19/12*       (2006.01)
    *C09K 19/18*       (2006.01)
    *C09K 19/58*       (2006.01)
    *C09K 19/54*       (2006.01)
    *G02F 1/137*       (2006.01)
    *G02F 1/29*        (2006.01)
    *C09K 19/04*       (2006.01)
    *G02F 1/1335*     (2006.01)

(52) U.S. Cl.
    CPC ........ *C09K 19/2007* (2013.01); *C09K 19/542* (2013.01); *C09K 19/586* (2013.01); *C09K 19/588* (2013.01); *G02F 1/137* (2013.01); *G02F 1/29* (2013.01); *C09K 2019/0448* (2013.01); *C09K 2019/122* (2013.01); *C09K 2019/123* (2013.01); *C09K 2019/183* (2013.01); *C09K 2019/2035* (2013.01); *C09K 2019/2042* (2013.01); *C09K 2019/2078* (2013.01); *C09K 2019/548* (2013.01); *G02F 1/133526* (2013.01); *G02F 2001/13775* (2013.01); *G02F 2001/13793* (2013.01); *G02F 2001/133565* (2013.01); *G02F 2001/294* (2013.01); *G02F 2203/06* (2013.01); *G02F 2203/21* (2013.01)

(56) References Cited

U.S. PATENT DOCUMENTS

| | | | | |
|---|---|---|---|---|
| 2008/0079877 | A1* | 4/2008 | Nakatsugawa | ...... G02B 5/3083 349/118 |
| 2009/0135368 | A1 | 5/2009 | Haseba et al. | |
| 2013/0107188 | A1* | 5/2013 | Kubota | .............. C09K 19/0275 349/183 |
| 2013/0114009 | A1 | 5/2013 | Yamamoto et al. | |
| 2013/0153822 | A1 | 6/2013 | Zheng et al. | |
| 2013/0299740 | A1* | 11/2013 | Zheng | ................ C09K 19/0275 252/299.01 |
| 2013/0321745 | A1 | 12/2013 | Kubota | |
| 2013/0341566 | A1 | 12/2013 | Hsieh | |
| 2014/0225035 | A1* | 8/2014 | Wittek | ............... C09K 19/0275 252/299.01 |
| 2015/0212348 | A1 | 7/2015 | Kubota | |

FOREIGN PATENT DOCUMENTS

| | | |
|---|---|---|
| JP | 2011-232753 | 11/2011 |
| JP | 2013-138726 | 7/2013 |
| JP | 2017-503056 | 1/2017 |
| WO | WO2013/065622 | 5/2013 |
| WO | WO2014/082699 | 6/2014 |
| WO | WO2014/196527 | 12/2014 |

OTHER PUBLICATIONS

Spectra group limited inc., "Photoinitiators", http://www.sglinc.com/Home/LimitedHomepage/Photoinitiators.aspx, Mar. 10, 2013, pp. 1-2. (Year: 2013).*
Kikuchi et al., "Polymer-Stabilized Liquid Crystal Blue Phases", Sep. 2002, Nature Materials, vol. 1, 64-68. (Year: 2002).*
Tan et al., "Blue Phase LC/Polymer Fresnel Lens Fabricated by Holographics", Feb. 2014, Journal of Display Technology, vol. 10 No. 2, 157-161. (Year: 2014).*
International Search Report and Written Opinion of the International Searching Authority dated Oct. 5, 2016 in PCT/EP2016/066049, citing documents AA-AG and AX therein, 12 pages.
Zakir Hussain, et al., "Investigation of Reactive Acrylic Monomers for their Effect on the Temperature Range and Operating Voltage of Polymer-Stabilised Optically Isotropic Liquid Crystal Blue Phases" Liquid Crystals, Taylor & Francis, vol. 39, No. 11, XP001579010, Nov. 1, 2012, pp. 1345-1357.
Hirotsugu Kikuchi, et al., "Polymer-Stabilized Liquid Crystal Blue Phases" Nature Materials, vol. 1, Sep. 2002, pp. 64-68.
Chinese Office Action dated Jul. 3, 2020, in corresponding Chinese Patent Application No. 2019800406756.
Office Action dated Sep. 1, 2020, in corresponding Japanese Patent Application No. 2018-500392 (with English translation).

* cited by examiner

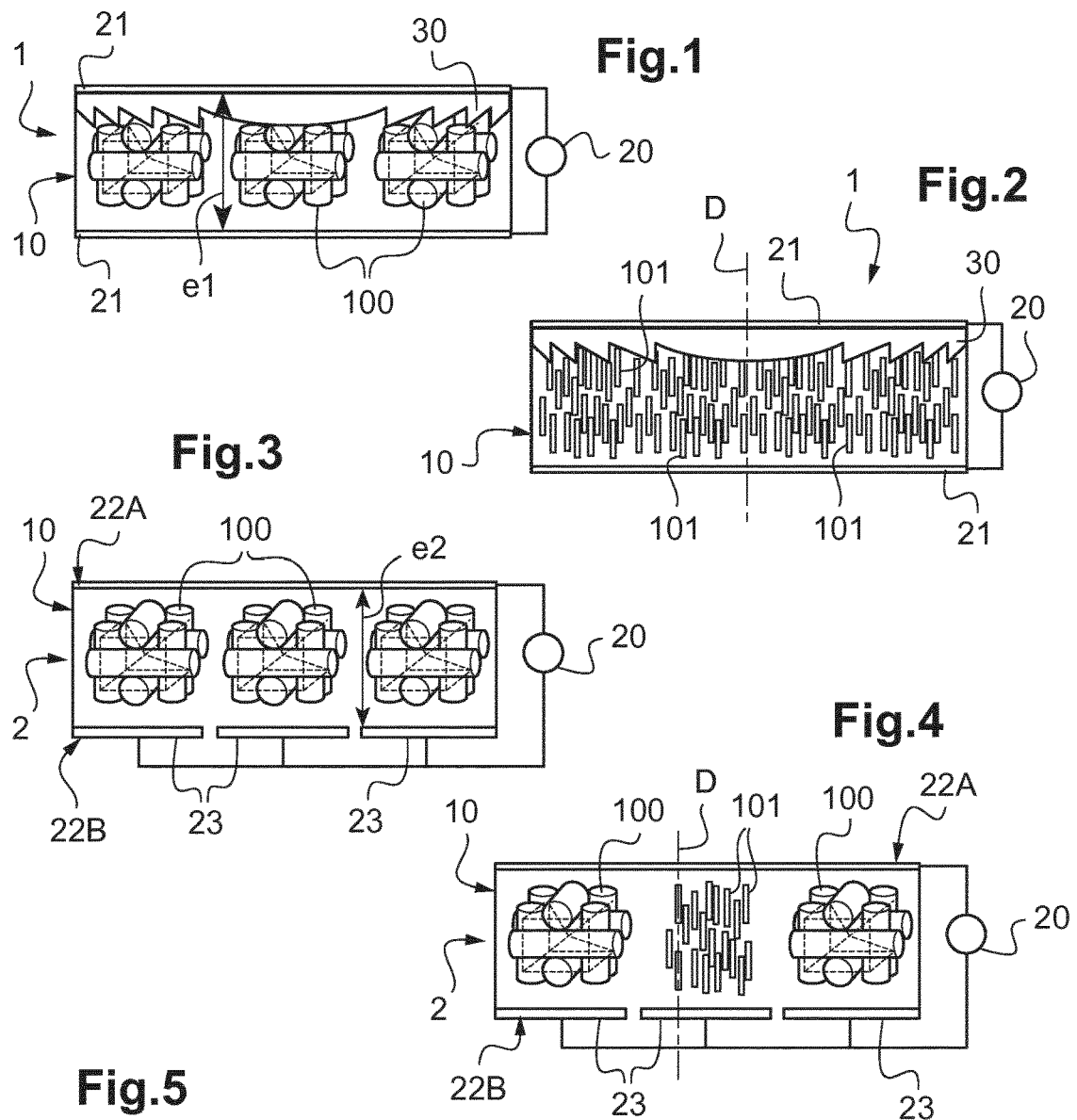
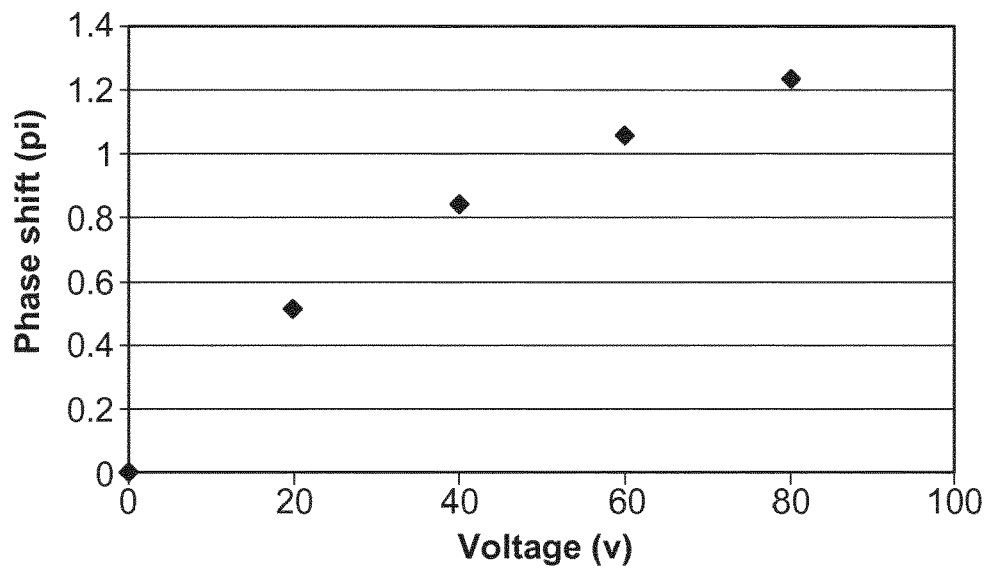

METHOD FOR OBTAINING A MATERIAL COMPRISING A LIQUID CRYSTAL MIX WITH A STABILIZED BLUE PHASE AND OPTICAL ARTICLE COMPRISING THIS MATERIAL

CROSS-REFERENCE TO RELATED APPLICATIONS

This application is a National Phase of PCT/EP2016/066049, which was filed on Jul. 6, 2016. This application is based upon and claims the benefit of priority to European Application No. 15175947.9, which was filed on Jul. 8, 2015.

TECHNICAL FIELD OF THE INVENTION

The invention relates to a method for obtaining a material comprising mesogenic compounds forming a liquid crystal mix with a stabilized blue phase.

The invention finds an especially interesting application into the manufacturing of an optical article, such as a lens, of global variable refractive index comprising at least a part made of said material comprising a liquid crystal mix with a stabilized blue phase.

BACKGROUND INFORMATION AND PRIOR ART

It is well known that liquid crystals can form blue phases that consist in an arrangement of liquid crystal molecules into double twist cylinders assembled into three dimensional cubic lattice structures.

These physical states of the liquid crystals named blue phases are rather unstable as they naturally exist over small ranges of temperatures, usually over a few Celsius degrees only.

We know from the article "Polymer stabilized liquid crystal blue phase", Nature Mater. (2002), 64-68, by Kikuchi et al., that a polymer stabilization method can provide a polymer network to extend the stability of said blue phase structures to wider ranges of temperatures, sometimes up to a hundred of Celsius degrees.

This polymer stabilization method is based on adding monomers to a liquid crystal solution, on creating conditions for liquid crystals to be arranged in blue phase and on initiating the polymerization of said monomers with photo-initiators stimulated by Ultra-Violet (UV) light beams.

The UV-stimulated photo-initiators do not absorb visible light. Thus, in the visible region, the light absorption of the final polymer material comprising blue phase liquid crystals is not influenced by these UV-stimulated photo-initiators.

However, the applicant noticed that this method did not enable to efficiently stabilize in temperature the blue phases of any liquid crystal mixes.

SUMMARY OF THE INVENTION

Therefore one object of the invention is to provide a new method for obtaining a material comprising mesogenic compounds forming a liquid crystal mix with a stabilized blue phase.

The above object is achieved according to the invention by providing a method for obtaining a material comprising mesogenic compounds forming a liquid crystal mix with a stabilized blue phase, comprising the following steps:

a) preparing a chemical composition comprising a mesogenic system and a chemical photo-initiator system, the mesogenic system including
  said mesogenic compounds forming the liquid crystal mix,
  a chiral dopant adapted to induce said blue phase, and
  a monomer mix comprising monomers adapted to polymerize,
  and the chemical photo-initiator system being adapted to trigger the polymerization of said monomers when illuminated by a light beam of visible wavelength;
b) getting said liquid crystal mix to form said blue phase;
c) after getting said liquid crystal mix into said blue phase, illuminating the chemical composition obtained in step a) with a light beam of visible wavelength in order to trigger the polymerization of said monomers;
d) obtaining said material comprising said liquid crystal mix in the blue phase stabilized by the polymerized monomers.

Thanks to the method according to the invention, the blue phase of the liquid crystal mix may be stabilized without using UV-light beam for photo-polymerization.

Indeed, the applicant noticed that the liquid crystal mixes whose blue phases are not efficiently stabilized by the known method comprise mesogenic compounds that more efficiently absorb UV-light than the mesogenic compounds of the liquid crystal mixes that are efficiently stabilized by the known method.

This indicates that the mesogenic compounds absorbing UV-light are either degraded by UV-light or prevent the UV-stimulated photo-initiators from receiving enough UV-light to be stimulated.

Thus, according to the method object of the invention, a wide range of mesogenic compounds, including those that are damaged by UV-light or that absorb UV-light may be used to obtain said material comprising a liquid crystal mix with a stabilized blue phase.

The material comprising a liquid crystal mix with a stabilized blue phase obtained thanks to the method according to the invention presents a variable refractive index depending on the electromagnetic field in which it is placed.

More precisely, the liquid crystal mix contained in this material exhibits a first refractive index value while in blue phase, observed under usual ambient conditions of electromagnetic field, and a second refractive index value, different from the first refractive index value, while placed in an electromagnetic field, for example, between two powered electrodes.

It is sought to achieve the material according to the invention with the largest range of refractive index value that may be obtained.

The method according to the invention is particularly adapted to manufacture such a material with a large difference between the first and second refractive index values. More specifically, the method according to the invention enables to obtain a material with a larger refractive index values difference than the known methods.

The mesogenic compounds that have to be used in the liquid crystal mix in order to get a large refractive index values difference between the first and second refractive index values are indeed adapted to be used in the method according to the invention, whereas they are not adapted to be used in the known methods. The blue phases of the corresponding liquid crystals are not efficiently stabilized by the known methods.

According to a first advantageous and non limitative characteristic of the method of the invention, said material exhibiting a first refractive index value for an incident light beam when said liquid crystal mix is in the stabilized blue phase, and exhibiting a second refractive index value for this incident light beam when the mesogenic compounds of said liquid crystal mix align along a common direction under the effect of an electromagnetic field, step a) comprises a step of selecting the mesogenic compounds comprised in said liquid crystal mix so that the difference between said second refractive index value and said first refractive index value is greater than or equal to 0.1.

In particular, said second refractive index value of said material reaching a minimal value when the common direction along which all the mesogenic compounds of said liquid crystal mix align under the effect of said electromagnetic field is parallel to the direction of said incident light beam, the step of selecting the mesogenic compounds is accomplished so that the difference between said minimal value of the second refractive index value and said first refractive index value is greater than or equal to 0.2.

The material comprising such a liquid crystal mix with a stabilized blue phase thus exhibits a wide refractive index value range between two states of this material: a first state in which said material is left out of the influence of any electromagnetic field adapted to align the mesogenic compounds, and a second state in which said material is placed in such an electromagnetic field.

Such a material is especially useful in order to manufacture an optical article with a global variable refractive index within a wide range of refractive index values achievable.

According to a second advantageous and non limitative characteristic of the method of the invention, in step d), the chemical photo-initiator system contained in the material obtained in step d) is colorless.

By "colorless", it is to be understood that it exhibits no, or very few, absorbance in the range comprised between 380 nanometers (nm) and 780 nm, or in the range comprised between 400 nm and 700 nm.

In particular, said chemical photo-initiator system is colored when added to prepare said chemical composition in step a), and photo-bleaches while illuminated with said light beam of visible wavelength in step c) to be colorless in the material obtained in step d).

Such a material is thus especially useful in order to manufacture a transparent optical article.

Other characteristics of the method of this invention are the following:

in step a), the mesogenic compounds comprised in said mesogenic system are selected exclusively among nematic liquid crystals of the following chemical formulas:

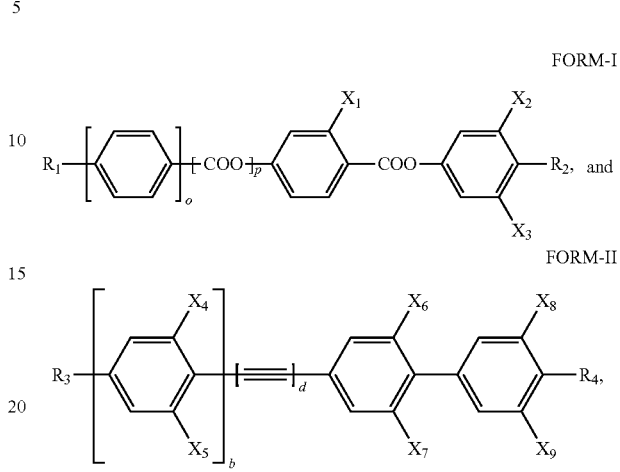

wherein
$R_1$ to $R_4$ are each independently one of the following atoms or groups: H, F, Cl, Br, I, CN, NO2, N-chlorosuccinimide, or an alkyl which is a straight chain or a branched chain, with preferably 1 to 20 atoms of Carbon, and which is unsubstituted, mono- or poly-substituted by F, Cl, Br, I or CN, $X_1$ to $X_9$ are each independently one of the following atoms or groups: H, F, Cl, Br, I, CN, NO2, N-chlorosuccinimide or an alkyl which is straight chain or branched, with preferably 1 to 5 atoms of Carbon, and which is unsubstituted, mono- or poly-substituted by F, Cl, Br, I or CN, and o, p, b and d are independent of each other and either 0 or 1;

in step a), the monomer mix comprised in the mesogenic system comprises:

low molecular weight reactive monomers of formula FORM-III

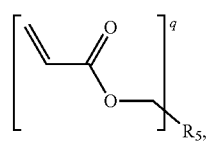

wherein
$R_5$ is one of the following: an H atom or an alkyl which is a straight or a branched chain with preferably 1 to 20 atoms of carbon, and
q is either 1, 2, or 3, and
high molecular weight reactive monomers, which optionally are mesogenic compounds, of formula FORM-IV

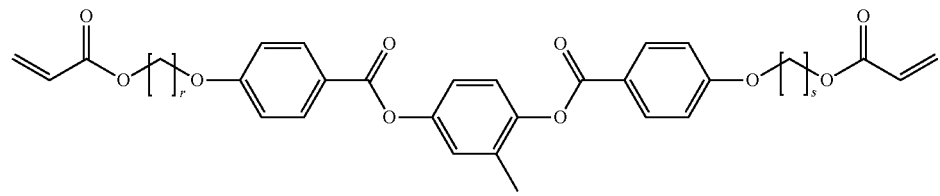

wherein r and s are each independently an integer from 1 to 12;

in step a), the mesogenic system is prepared with the following composition in weight compared to the total weight of mesogenic system:

from 2% to 70%, preferably from 5% to 30%, of mesogenic compounds of formula FORM-I, from 2% to 70%, preferably from 2% to 40%, of mesogenic compounds of formula FORM-II, from 0.5% to 35%, preferably from 0.5% to 15%, of low molecular weight reactive monomers of formula FORM-III, from 0.5% to 35%, preferably from 0.5% to 20%, of high molecular weight reactive monomers of formula FORM-IV, and from 1% to 35%, preferably from 1% to 15%, of chiral dopants;

in step a), the chemical photo-initiator system is chosen within the following systems:

2,4-bis julolidenyl cyclopentanone with 2,2',4-Tris(2-chlorophenyl)-5-(3,4-dimethoxyphenyl)-,4',5'-diphenyl-1,1'-biimidazole and mercapto benzoxazole;

rose Bengal dye and n-phenyl glycine;

erythrosine B with triethanolamine initiator and N,N'-methylenebisacrylamide monomers;

methylene blue and triethanolamine initiator;

methylene blue and p-toluensulfonic acid;

bis(2,4,6-trimethylbenzoyl)-phenylphosphineoxide (Irgacure 819);

cyanine dye with 5,5'-Dichloro-11-diphenylamino-3,3'-diethyl-10,12-ethylenethiatricarbocyanine perchlorate (IR-140 initiator), with ethyl-di-methyl-amino-benzoate (electron donor) and tetrabromomethane;

dibromofluorescein (xanthene dye) and N-phenylglycine;

5,7-diiodo-3-butoxy-6-fluorone (H-Nu 470, $C_{17}H_{14}I_2O_3$) with 2,4,5,7-Tetraiodo-3-hydroxy-6-fluorone (H-Nu 535, $C_{13}H_3I_4O_3$) and 2,4,5,7-Tetraiodo-3-hydroxy-9-cyano-6-fluorone (H-Nu 635, $C_{14}H_2I_4NO_3$,) with an amine and an iodonium salt co-initiator;

preferably 2,4-bis julolidenyl cyclopentanone with 2,2', 4-Tris(2-chlorophenyl)-5-(3,4-dimethoxyphenyl)-,4',5'-diphenyl-1,1'-biimidazole and Mercapto benzoxazole;

in step a), the chiral dopant comprised in said mesogenic system exhibits at least a cholesteric phase;

in step a), the chiral dopant comprised in said mesogenic system comprises at least one of the following compounds: cholesterylnonanoate, R/S-811, R/S-1011, R/S-2011, R/S-3011, R/S-4011, R/S-5011, CB-15, ZLI-5011.

A further object of the invention is to provide an optical article of global variable refractive index comprising at least a part made of said material comprising the liquid crystal mix with a stabilized blue phase obtained according to any of claims 1 to 10, sandwiched between at least two electrodes connected to a power source, adapted to place said material in an electric field.

The optical article of global variable refractive index according to the invention has a global refractive index that can be varied in a controlled manner, by controlling the voltage difference between the electrodes. In other words, one may control the influence of this optical article on light beams going through this article. The "influence" of the optical article on light may include the deviation of the incident light beam or its phase shift.

Other characteristics of said optical article according to this invention are the following:

said material is formed in a predetermined shape to manufacture said optical article.

said material is formed over a Fresnel lens to manufacture the optical article, said material exhibiting a minimal second refractive index value for an incident light beam when the mesogenic compounds align along the direction of this incident light beam under the effect of an electromagnetic field generated between said electrodes and the Fresnel lens exhibiting a third refractive index value equal to the minimal second refractive index value;

at least one of the electrodes comprises a plurality of electrode elements, each of the electrode elements being adapted to be selectively powered in order to place a portion of said material located next to the electrode element in an electric field.

DETAILED DESCRIPTION OF EXAMPLE(S)

The following description, enriched with joint drawings that should be taken as non limitative examples, will help understand the invention and figure out how it can be realized.

On joint drawings:

FIG. 1 is a schematic side view of a first embodiment of the optical article according to the invention;

FIG. 2 is a schematic side view of the first embodiment of the optical article represented on FIG. 1, said optical article being submitted to an electrical voltage;

FIG. 3 is a schematic side view of a second embodiment of the optical article according to the invention;

FIG. 4 is a schematic side view of the second embodiment of the optical article represented on FIG. 3, said optical article being submitted to an electrical voltage;

FIG. 5 is a graph giving the phase shift of a given incident light beam entering an optical article according to the invention, as a function of the voltage, in volts (V).

On FIGS. 1, 2, 3 and 4, we have represented an optical article 1; 2 according to the invention.

Said optical article 1; 2, of global variable refractive index, comprises a material 10 sandwiched between at least two electrodes 21; 22A, 22B connected to a power source 20 that can either generate a voltage or be switched off.

Said material 10 comprises mesogenic compounds 101 (FIGS. 2 and 4) forming a liquid crystal mix with a stabilized blue phase 100 (FIGS. 1 to 4). Basically, the material 10 in the optical article 1; 2 is made of a polymer matrix in which is trapped the liquid crystal mix that is in a specific physical state called blue phase 100.

Each mesogenic compound is defined as a chemical molecule comprising at least a mesogenic group, that is to say a part endowed with sufficient anisotropy in both attractive and repulsive forces to contribute strongly to liquid-crystal mesophase formation in low-molar-mass and polymeric substances.

The mesogenic compounds 101 are the molecules forming the liquid crystal mix. They exhibit various orientational and positional orders in said liquid crystal mix, depending mainly on temperature, pressure, electromagnetic field, and their concentration in said liquid crystal mix.

Said orientational and positional orders of the mesogenic compounds 101 allow the liquid crystal mix to exhibit different kinds of structural phases, also called "mesophases", among which:

a nematic phase, which is an ordered phase in which the mesogenic compounds 101 exhibit long-range orientational order without any positional order, the blue phase 100 in which the mesogenic compounds 101 have a particular constrained arrangement into double twist cylinders assembled into three dimensional cubic lattice structures, and an electromagnetically orientated phase in which the mesogenic compounds 101 exhibit long-range orientational order without any positional order with an orientation imposed by the electromagnetic field.

Whereas the nematic phase and blue phase may be observed under ambient conditions of electromagnetic field, the electromagnetically orientated phase is only observed when the liquid crystal mix is subjected to an additional electromagnetic field, other than the ambient electromagnetic field, that forces the mesogenic compounds 101 to align along a given direction.

The mesogenic compounds 101 are responsible for the liquid-crystalline properties of the liquid crystal mix, that is, the fact that the liquid crystal mix may be organized in various liquid-crystal mesophases.

The liquid-crystal mesophases are phases occurring over a definite range of temperature, pressure, or concentration within the mesomorphic states, that is to say, the states of matter in which the degree of molecular order is intermediate between the perfect three-dimensional, long-range positional and orientational order found in solid crystals and the absence of long-range order found in isotropic liquids, gases, and amorphous solids.

More precisely, the liquid-crystal mesophases are mesomorphic states having long-range orientational order.

As explained in more details later on, in the material 10, the liquid-crystal blue phase 100 is stabilized. By stabilized, it is meant that the liquid-crystal blue phase 100 of the liquid crystal mix in said material 10 is maintained under a wider temperature range than the blue phase of the same liquid crystal mix that is not contained in said material 10.

More specifically, the blue phase is stable at ambient temperature, and under atmospheric pressure, which allow its use for industrial purposes.

As will also be explained later, thanks to the presence of this liquid-crystal blue phase 100 in the material 10, the refractive index of the material 10 may be varied in a controlled manner.

In the following, we will first describe an embodiment of the method for obtaining the material 10 according to the invention and secondly describe embodiments of the optical articles according to the invention that are manufactured with this material 10 and their way of use.

In a remarkable way, the method for obtaining said material 10 according to the invention comprises the following steps:

a) preparing a chemical composition comprising a mesogenic system and a chemical photo-initiator system, the mesogenic system including said mesogenic compounds 101 forming the liquid crystal mix, a chiral dopant adapted to induce said blue phase 100, and a monomer mix comprising monomers adapted to polymerize, and the chemical photo-initiator system being adapted to trigger the polymerization of said monomers when illuminated by a light beam of visible wavelength;

b) getting said liquid crystal mix to form a blue phase 100;

c) after getting said liquid crystal mix to form the blue phase 100, illuminating the chemical composition obtained in step a) with a light beam of visible wavelength in order to trigger the polymerization of said monomers;

d) obtaining said material 10 comprising said liquid crystal mix in the blue phase 100 stabilized by the polymerized monomers.

Step a)

In particular, in step a), the operator prepares said chemical composition comprising the mesogenic system and the chemical photo-initiator system.

The mesogenic system according to the invention comprises from 3 to 30, preferably from 5 to 20, different compounds, and more preferably, from 6 to 14 different compounds. Among these compounds, at least one is a mesogenic compound 101, at least another one is a chiral dopant and at least another one is a monomer.

The chiral dopant and the mesogenic compounds 101 form what we will call in the following an intermediate mesogenic system.

Here, the mesogenic compounds 101 comprised in the liquid crystal mix are selected exclusively among nematic liquid crystals of the following chemical formulas:

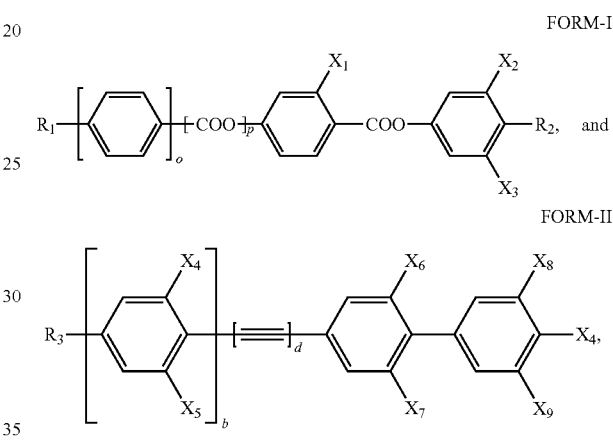

FORM-I

FORM-II wherein $R_1$ to $R_4$ are each independently one of the following atoms or groups: a hydrogen atom H, a fluorine atom F, a chlorine atom Cl, a bromine atom Br, an iodine atom I, a cyanide group CN, a nitrogen dioxide group $NO_2$, a N-chlorosuccinimide group (NCS), or an alkyl which is a straight chain or a branched chain, with preferably 1 to 20 atoms of Carbon, and which is unsubstituted, mono- or poly-substituted by a fluorine F, a chlorine Cl, a bromine Br, an iodine I atom or a cyanide CN group, $X_1$ to $X_9$ are each independently one of the following atoms or groups: H, F, Cl, Br, I, ON, NO2, N-chlorosuccinimide or an alkyl which is straight chain or branched, with preferably 1 to 5 atoms of Carbon, and which is unsubstituted, mono- or poly-substituted by F, Cl, Br, I or CN, and o, p, b and d are independent of each other and either 0 or 1.

For instance, the liquid crystal mix can be formed by the following mesogenic compounds:

$R_6$-Ph-COO-(PhF)—COO-(PhF)—CN, $R_7$-Ph-COO-(PhF)—CN, $R_8$-Ph-COO-(PhFF)—CN, and $R_9$-(PhF)—COO-(PhFF)—CN, all of these compounds being of formula FORM-I, and $R_{10}$-(PhFF)-$E_1$-Ph-Ph-$R_{11}$, $R_{12}$-(PhF)-$E_2$-(PhFF)-Ph-$R_{13}$, $R_{14}$-Ph-(PhF)-(PhFF)—F, all of these compounds being of formula FORM-II, wherein Ph is a Phenyl group, PhF is a phenyl group substituted with one atom of Fluor, PhFF is a phenyl group substituted with two atoms of Fluor, $R_6$ to $R_{14}$ are alkyl groups which are straight or a branched chains with 1 to 10 atoms of Carbon, and $E_1$, $E_2$ are vinylene or ethynylene groups.

More precisely, the liquid crystal mix can be formed by mixing all of, or some of, the mesogenic compounds listed in the table 1.

TABLE 1

| Chemical Structure | N° | Chemical Name |
|---|---|---|
| | 1 | 4-cyano-3-fluorophenyl 2-fluoro-4-((4-propylbenzoyl)oxy)benzoate |
| | 2 | 4-cyano-3-fluorophenyl 2-fluoro-4-((4-pentylbenzoyl)oxy)benzoate |
| | 3 | 4-cyano-3-fluorophenyl 4-propylbenzoate |
| | 4 | 4-cyano-3-fluorophenyl 4-pentylbenzoate |
| | 5 | 4-cyano-3,5-difluorophenyl 4-propylbenzoate |
| | 6 | 4-cyano-3,5-difluorophenyl 4-pentylbenzoate |
| | 7 | 4-cyano-3,5-difluorophenyl 2-fluoro-4-pentylbenzoate |
| | 8 | 4-((4-ethyl-2,6-difluorophenyl)ethynyl)-4'-propyl-1,1'-biphenyl |

TABLE 1-continued

| Chemical Structure | N° | Chemical Name |
|---|---|---|
| (structure) | 9 | 4-((4-butyl-2,6-difluorophenyl)ethynyl)-4'-propyl-1,1'-biphenyl |
| (structure) | 10 | 4'-butyl-4-((4-butyl-2-fluorophenyl)ethynyl)-2,6-difluoro-1,1'-biphenyl |
| (structure) | 11 | 2',3,4,5-tetrafluoro-4''-propyl-1,1':4',1''-terphenyl |

The mesogenic system also comprises the chiral dopant. This chiral dopant is adapted to induce the mesogenic compounds 101 to get organized into said blue phase 100.

Here, the chiral dopant has itself a mesogenic structure and exhibits preferably one or more mesophases of which at least one is a cholesteric phase.

The chiral dopant is formulated, for example, with at least one of the following compounds, which are well-known chiral dopants: the cholesterylnonanoate, or the commercially available R/S-811, R/S-1011, RIS-2011, R/S-3011, R/S-4011, R/S-5011, ZLI-5011 and CB-15 (from Merck KGaA, Darmstadt, Germany).

It is to be noted that the chiral dopants R-1011/S-1011 can sometimes be found under the name ZLI-4572/ZLI-4571. Similarly, the pair of chiral dopants R-2011/S-2011 may also be named MLC-6248/MLC-6247.

Usually, said chiral dopant is a mix of several of these compounds.

Preferably, the chiral dopant is formulated by mixing the chiral dopants given in table 2.

TABLE 2

| Chemical structure | Usual Name |
|---|---|
| (structure) | R/S-1011 |
| (structure) | R/S-5011 |
| (structure) | CB-15 |

The mesogenic system also comprises the monomer mix.

This monomer mix comprises monomers adapted to polymerize to form said polymer matrix of the material 10.

The monomer mix comprised in the mesogenic system comprises for example:

low molecular weight reactive monomers of formula

FORM-III

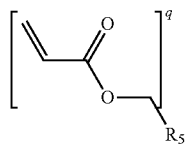

wherein

R5 is one of the following atoms or groups: an hydrogen H or an alkyl group which is a straight or a branched chain with preferably 1 to 20 atoms of Carbon, and q is either 1, 2, or 3, and high molecular weight reactive monomers, which optionally are mesogenic compounds, of formula

FORM-IV

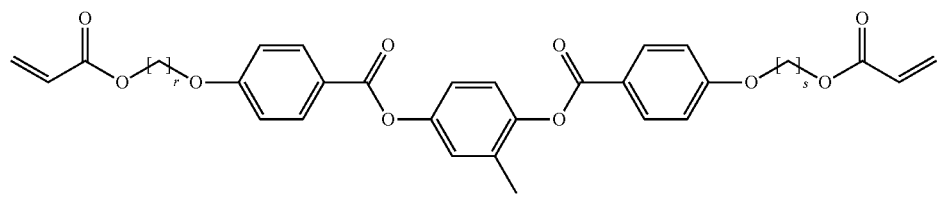

wherein r and s are each independently an integer from 1 to 12.

Preferably, the monomer mix comprises the well-known commercially available monomers EHA, and TMPTA that are both low molecular weight reactive monomers of formula FORM-II (from Sigma-Aldrich). The monomer mix may also comprise RM-257, which is a high molecular weight reactive monomer of formula FORM-III.

More precisely, EHA is the 2-Ethylhexyl acrylate, of formula

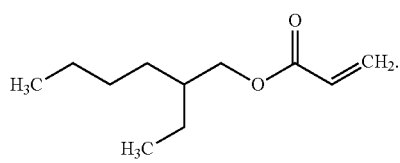

TMPTA is the 2,2-Bis[(acryloyloxy)methyl]butyl acrylate, of formula

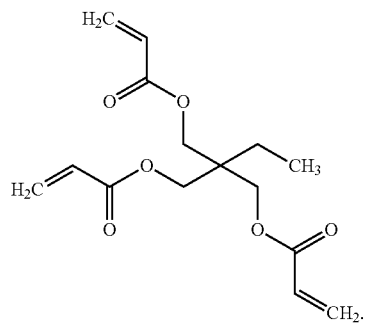 [SMILES: C=CC(=O)OCC(CC)(COC(=O)C=C)COC(=O)C=C]

RM-257 is the following molecule: 2-Methyl-1,4-phenylene bis{4-[3-(acryloyloxy)propoxy]benzoate}, of formula FORM-III in which r and s both equal 3.

Regarding the composition of the mesogenic system, in step a), the operators prepares said mesogenic system preferably within the following proportions, given in weight compared to the total weight of the mesogenic system:

from 2% to 70% of mesogenic compounds of formula FORM-I,
from 2% to 70% of mesogenic compounds of formula FORM-II,
from 0.5% to 35% of low molecular weight reactive monomers of formula FORM-III,
from 0.5% to 35% of high molecular weight reactive monomers of formula FORM-IV, and
from 1% to 35% of chiral dopants.

More preferably, in step a), the operators prepares the mesogenic system with the following composition, given in weight compared to the total weight of the mesogenic system:

from 5% to 30% of mesogenic compounds of formula FORM-I,
from 2% to 40% of mesogenic compounds of formula FORM-II,
from 0.5% to 15% of low molecular weight reactive monomers of formula FORM-III,
from 0.5% to 20% of high molecular weight reactive monomers of formula FORM-IV, and
from 1% to 15% of chiral dopants.

In step a), the operator also prepares the chemical photo-initiator system adapted to trigger the polymerization of said monomers comprised in the monomer mix when illuminated by a light beam of visible wavelength.

As mentioned before, visible wavelengths are comprised in the range extending from 380 nm to 800 nm.

Here, the chemical photo-initiator system is soluble within the mesogenic system, so that the chemical composition forms one phase only.

The chemical photo-initiator system is also efficient to trigger said polymerization even when used in small concentration, that is to say at concentration smaller than 5%, preferably smaller than 1%, in weight compared to the total weight of chemical composition.

Said chemical photo-initiator system is one system chosen within the following systems:

2,4-bis julolidenyl cyclopentanone with 2,2',4-Tris(2-chlorophenyl)-5-(3,4-dimethoxyphenyl)-,4',5'-diphenyl-1,1'-biimidazole and mercapto benzoxazole;
rose Bengal dye and n-phenyl glycine;
erythrosine B with triethanolamine initiator and N,N'-methylenebisacrylamide monomers;
methylene blue and triethanolamine initiator;
methylene blue and p-toluensulfonic acid;
bis(2,4,6-trimethylbenzoyl)-phenylphosphineoxide, also usually called Irgacure 819;

cyanine dye with 5,5'-Dichloro-11-diphenylamino-3,3'-diethyl-10,12-ethylenethiatricarbocyanine perchlorate, also usually called IR-140 initiator, with ethyl-dimethyl-amino-benzoate and tetrabromomethane;

dibromofluorescein, also usually called xanthene dye and N-phenylglycine;

5,7-diiodo-3-butoxy-6-fluorone, also usually called H-Nu 470 with 2,4,5,7-Tetraiodo-3-hydroxy-6-fluorone, also usually called H-Nu 535 and 2,4,5,7-Tetraiodo-3-hydroxy-9-cyano-6-fluorone, also usually called H-Nu 635 with an amine and an iodonium salt co-initiator.

A mix of two or more of the photo-initiator systems listed here above can also be used as another photo-initiator system.

Preferably, the chemical photo-initiator system is the 2,4-bis julolidenyl cyclopentanone with 2,2',4-Tris(2-chlorophenyl)-5-(3,4-dimethoxyphenyl)-,4',5'-diphenyl-1,1'-biimidazole and Mercapto benzoxazole.

All of these chemical photo-initiator systems are colored when added to the mesogenic system to form the chemical composition in step a).

Step b)

In step b), the operator gets said mesogenic compounds 101 to form said liquid crystal mix with a blue phase 100.

As mentioned earlier, the blue phase 100 of a given liquid crystal mix often exists only in a predetermined small range of temperature and pressure conditions. The operator works here at atmospheric pressure.

In step b), the operator may heat up the intermediate mesogenic system in order for the mesogenic compounds 101 to get organized into blue phase 100.

The operator may achieve such a heat up between 25° C. and 100° C.

As a variation, the mesogenic compounds 101 may get organized into blue phase 100 without the need of any heat up. In this case, the liquid crystal mix may adopt its blue phase arrangement while step a) is performed. Steps a) and b) are then achieved simultaneously, at ambient temperature.

Optionnally, at the end of step b), to check whether the mesogenic compounds are indeed organized in blue phase 100, the operator observes the chemical composition under a microscope equipped with crossed polarizers. Indeed, when the mesogenic compounds 101 forming the liquid crystal mix are in blue phase 100, a distinctive texture, known as "platelets" appears under such microscope.

This checking step can be achieved simultaneously with the heating up, when such heating up is performed.

Step c)

In step c), the operator illuminates the chemical composition obtained in step a) with a light beam of visible wavelength in order to trigger the polymerization of said monomers.

The illumination in step c) usually lasts between 1 minute and 30 minutes.

The mesogenic compounds of the chemical composition do not exhibit a strong absorption in the visible wavelengths. Moreover, absorption in the visible wavelength do not bring as much energy to the molecules as absorption in the UV wavelength range. Therefore, the mesogenic compounds are not damaged by the visible illumination.

By illuminating the chemical composition, the operator provides enough energy to the chemical photo-initiator system for it to trigger the polymerization of the monomers comprised in the mesogenic system.

Advantageously, after visible light absorption, the chemical photo-initiator is photo-bleached, that is to say, it becomes colorless.

In other words, whereas said chemical photo-initiator system is colored when added to prepare said chemical composition in step a), it is photo-bleached in step c) and becomes colorless in the material 10 obtained by the method according to the invention in step d).

A compound is here defined as colorless if, when illuminated by a light of visible wavelength, it transmits at least 80% of said light of visible wavelength.

Here, the polymerization is a radical polymerization.

Of course, any other type of polymerization could be performed.

Step d)

In step d), the operator obtains the material 10 which is the polymer matrix in which is trapped the liquid crystal mix with a stabilized blue phase 100.

The only color that may subsist in the material 10 obtained in step d) is due to the liquid crystal mix organized in blue phase 100. Indeed, said blue phase 100 may slightly color the material 10 in blue.

It is to be noticed that the operator may perform the steps a) to d) of the method according to the invention in various orders.

In a first embodiment of the method, the operator may perform step a), b), and c) successively in that order.

As a variation, steps a) and b) could be performed simultaneously when no heating is needed to get the mesogenic compounds 101 organized into blue phase 100.

In a second embodiment of the method, the operator may partially perform step a) by preparing the intermediate mesogenic system comprising the mesogenic compounds 101 and the chiral dopant. Then, the operator may perform step b) to get said mesogenic compounds to form said liquid crystal mix with a blue phase 100. After that, the operator may complete step a) by adding to the intermediate mesogenic system—now forming the liquid crystal mix with a blue phase—the monomer mix and the chemical photo-initiator system. Then, the operator may perform step c) to polymerize the monomers.

In both first and second embodiments of the method, step d) is the last step to be performed.

The method according to the invention provides a material 10 comprising a liquid crystal mix with a blue phase 100 stabilized on a wide range of temperatures.

Here, the liquid crystal mix is stabilized in blue phase 100 for temperatures ranging from minus 20 Celsius degrees (−20° C.) to 70° C.

As a comparison, the liquid crystal blue phases are usually only observed in temperature ranged of a few degrees Celsius for liquid crystals that are not stabilized in such a material as obtain by the method according to the invention.

Moreover, as mentioned earlier, the material 10 obtained exhibits, thanks to the liquid crystal mix in blue phase, a variable refractive index that can be varied in a controlled manner.

More specifically, the liquid crystal mix is in said blue phase 100 when the material 10 is in a "relaxed state".

The "relaxed state" of the material 10 is the state of the material 10 when it is left out of the influence of any electromagnetic field adapted to align the mesogenic compounds 101.

It is typically the case when the material 10 is only submitted to the geomagnetic field, that is to say, the electromagnetic field of Earth.

In this relaxed state, the material 10 is isotropic and exhibits the first refractive index value n1 for a given incident light beam.

The "incident light beam" is a light beam hitting an interface between air and material 10 under a given direction of incidence.

In other word, when the material 10 is in its "relaxed state", that is to say in the state in which the liquid crystal mix is in blue phase 100, it exhibits the first refractive index value n1 for a given incident light beam.

When the material 10 is submitted to an electromagnetic field of sufficient magnitude, the blue phase 100 can be temporarily unsettled.

Indeed, when said material 10 is placed in an electromagnetic field, the mesogenic compounds 101 of the liquid crystal mix tend to align along said electromagnetic field to form the electromagnetically orientated phase. The specific three dimensional molecular arrangement of the blue phase 100 is temporarily broken.

The material 10 is then said to get into an "activated state" in which it is anisotropic and exhibits a second refractive index value n2 for a given incident light beam, said second refractive index value n2 being smaller than said first refractive index value n1.

In other words, the material 10 exhibits the second refractive index value n2 for said incident light beam when the mesogenic compounds 101 of said liquid crystal mix align along a common direction D under the effect of an electromagnetic field.

In addition, the greater the magnitude of the electromagnetic field, the more the mesogenic compounds 101 tend to align along said common direction D.

Indeed, depending on the electromagnetic field applied to the material 10, some mesogenic compounds 101 of said liquid crystal mix may align along said common direction D, and some others may stay organized in blue phase 100. The liquid crystal mix is thus said "in transition to the electromagnetically orientated phase".

As a consequence, the second refractive index value n2 of the material 10, for an incident light beam, is variable and can be varied with the variation of the magnitude of the electromagnetic field applied to it.

Moreover, for a magnitude of the electromagnetic field sufficient to align all mesogenic compounds of the liquid crystal mix, the second refractive index value n2 of said material 10 reaches a minimum n2min when the common direction D along which the mesogenic compounds 101 of said liquid crystal mix align under the effect of said electromagnetic field is parallel to the direction of incidence of said incident light beam.

To characterize the material 10, it is possible to compare first and second refractive index values n1, n2 exhibited by the material 10 for a given incident light beam and a given magnitude of the electromagnetic field.

To this effect, the difference Δn between the first and the second refractive index values n1, n2, for a given incident light beam and a given magnitude of the electromagnetic field is defined.

Advantageously, the difference Δn between said second refractive index value n2 and said first refractive index value n1 is greater than or equal to 0.1.

Mathematically, this can be written as: $\Delta n = |n2-n1| \geq 0.1$.

For instance, here, the difference Δn between said second refractive index value n2 and said first refractive index value n1 can be up to 0.2, 0.3 or even 0.4, for a given incident light beam and a given magnitude of the electromagnetic field.

In addition, a maximal difference Δnmax between said minimum n2min of the second refractive index value n2 and said first refractive index value n1 can be defined.

Advantageously, in the material 10 according to the invention, this maximal difference Δnmax is greater than or equal to 0.1, and can be greater than or equal to 0.2. Mathematically, it can be written as: $\Delta n_{max} = |n2min-n1| \geq 0.1$.

Advantageously, the material 10 exhibits a great difference Δn of refractive index values between its relaxed state and its activated state.

Furthermore, by choosing precisely the mesogenic compounds 101 forming the liquid crystal mix comprised in the material 10, it is possible to adjust the difference Δn between first and second refractive index values n1, n2 that can be exhibited by the material 10.

In other words, the difference between the second refractive index value n2 and the first refractive index value n1 exhibited by the material 10 for a given incident light beam, and a given magnitude of the electromagnetic field depends directly on the mesogenic compounds 101 comprised in the liquid crystal mix.

More precisely, the liquid crystal mix in nematic phase is known by the person skilled in the art. In particular, in this phase, the liquid crystal mix is anisotropic. All the mesogenic compounds 101 are thus aligned in different planes all parallel to one another, and the liquid crystal mix exhibits an extraordinary refractive index globally perpendicular to all of these planes, and an ordinary refractive index that belongs to a plane parallel to all of these plane, the extraordinary refractive index being greater than the ordinary refractive index.

When said liquid crystal mix is in blue phase, the material 10 exhibits the first refractive index n1 that is equal to about a third of the addition between the extraordinary refractive index and twice the ordinary refractive index of said liquid crystal mix.

When the liquid crystal mix is in electromagnetically orientated phase, with all mesogenic compounds aligned with the electromagnetic field and the incident light beam parallel to this electromagnetic field, the material 10 exhibits the minimal value n2min of the second refractive index n2, which is equal to the ordinary refractive index of the liquid crystal mix in nematic phase.

Thus, the maximal refractive index difference Δnmax exhibited by the material 10 between its relaxed state—in blue phase—and its activated state is equal to a third of the difference between the extraordinary refractive index and the ordinary refractive index of the liquid crystal mix contained in this material 10.

Each mesogenic compound 101 exhibits itself an ordinary and an extraordinary refractive index in its corresponding nematic phase. Therefore, mesogenic compounds with a wide refractive index difference between their ordinary refractive index and extraordinary refractive index, are preferably chosen to form a liquid crystal mix with a wide refractive index difference between its ordinary refractive index and extraordinary refractive index, in order to obtain a material 10 exhibiting a great difference Δn between its first and second refractive index values n1, n2.

Advantageously, these mesogenic compounds exhibiting a wide refractive index difference are preserved during step c) of the method according to the invention as the light beam of visible wavelength used to trigger the polymerization of the monomers do not damage such mesogenic compounds.

However, these mesogenic compounds are rather big molecules, and consequently they are viscous. This is the reason why, in practice, it is more convenient to mix different mesogenic compounds, each exhibiting various refractive index differences, to form the liquid crystal mix.

In other words, mixing different mesogenic compounds 101 to form the liquid crystal mix widens the range of temperatures over which said liquid crystal mix exists. Finally, in the material 10, the difference Δn between said second refractive index value n2 and said first refractive index value n1 is a mean of the respective refractive index differences of each mesogenic compound forming the liquid crystal mix, pondered by the weight fraction of each mesogenic compound in this mix.

For instance, in order to obtain a material 10 exhibiting a first refractive index value n1 of 1.7 and a second refractive index value n2 of 1.5 for a given incident light beam and a given magnitude of the electromagnetic field, that is to say a difference Δn of 0.2, the liquid crystal mix may contain some mesogenic compounds exhibiting an extraordinary refractive index value of 1.8, some others exhibiting an extraordinary refractive index value of 1.5 and some others exhibiting an extraordinary refractive index value of 2 or 2.1 or even 2.3.

Also, for the material 10 to exhibit a difference of refractive index of 0.1 between its activated state and its relaxed state—in blue phase, it is necessary that the liquid crystal mix in nematic phase initially exhibits a difference between its ordinary refractive index and its extraordinary refractive index of 0.3.

As mentioned earlier, the material 10 here above described is used to manufacture the optical article 1; 2 represented on FIGS. 1 to 4.

In such optical article 1; 2, the electrodes 21; 22A, 22B sandwiching the material 10 are powered by the power source 20.

The power source 20 is a voltage generator adapted to induce a voltage difference between said electrodes 21; 22A, 22B. Said power source 20 is either switched off, that is to say generates no voltage, or switched on to power the electrodes 21; 22A, 22B. Typically, it can generate a voltage ranging between −100 volts (V) and 100 V. This voltage can be a traditional direct voltage or a sinusoidal voltage for instance. Preferably, this voltage is of rectangular shape.

Moreover, the electrodes 21; 22A, 22B sandwiching the material 10 are each made of a conductive material.

Here, each electrode 21; 22A, 22B is made of indium-tin-oxide, an oxide transparent for visible light, that is to say for wavelengths ranging approximately from 380 nanometers (nm) to 800 nm.

In a first embodiment of the optical article 1 (FIGS. 1 and 2), the electrodes 21 are two plain electrodes 21.

In a second embodiment of the optical article 2 (FIGS. 3 and 4), one of the two electrodes 22A, 22B comprises a plurality of electrode elements 23.

In other words, the set of electrode elements 23 forms here the electrode 22B.

Each of the electrode elements 23 is adapted to be selectively powered by the power source 20 in order to induce a voltage difference only in a portion of said material 10, said portion being located next to the electrode element 23.

In this second embodiment, the power source 20 can power independently each electrode element 23 (FIG. 4). As a consequence, the power source 20 either powers all the electrode elements 23, or only a few of them, or even none of them.

As a variation of the second embodiment (not represented) of the optical article, both the electrodes could comprise electrode elements. In this case, preferably, the electrode elements would match one another to form pairs of electrode elements, each pair of electrode elements thus sandwiching a common portion of the material.

Moreover, whatever the embodiment of the optical article 1; 2, the material 10 sandwiched between said electrodes 21; 22A, 22B has preferably a thickness e1, e2 ranging from 1 micrometer (μm) to 50 μm.

In particular, in the first embodiment of the optical article 1 (FIGS. 1 and 2), the thickness e1 of material 10 sandwiched between the electrodes 21 is around 4 μm.

Moreover, in the first embodiment of the optical article 1 (FIGS. 1 and 2), the material 10 is formed over a Fresnel lens 30. Thus, in practice, both the Fresnel lens 30 and of the material 10 are sandwiched between the two electrodes 21 to form said optical article 1.

Here, said Fresnel lens 30 exhibits a refractive index having a third refractive index value n3.

In particular, to manufacture the first embodiment of the optical article 1, the chemical composition is placed on the Fresnel lens 30. After that, step c) of the method according to the invention is achieved. This is how the material 10 is formed, in situ, over the Fresnel lens 30.

As a variation of the first embodiment of the optical article, said material could be formed in a predetermined shape to manufacture said first embodiment of optical article.

For instance, step c) of the method according to the invention could be achieved when the material 10 is in a mold shaped as a lens, that is to say a mold having a given concavity.

In the second embodiment of the optical article 2 (FIGS. 3 and 4), the thickness e2 of material 10 sandwiched between the electrodes 22A, 22B is around 10 μm.

In this second embodiment of the optical article 2, the material 10 is formed directly on one of the electrodes 22A, 22B.

Whatever the embodiment of the optical article 1; 2, said optical article 1; 2 comprising the material 10 sandwiched in between at least two electrodes 21; 22A, 22B exhibits a global variable refractive index. This global variable refractive index results from the refraction of any incident light beam by the two electrodes of given fixed index and by the material 10 sandwiched in between, of variable refractive index.

Indeed, the electrodes 21; 22A, 22B, are adapted to be powered by the power source 20 to place said material 10 in an electric field, such electric field playing the role of the electromagnetic field able to induce said alignment of the mesogenic compounds 101 comprised in the material 10. The common direction D of alignment of the mesogenic compounds 101 is along the direction of this electric field between the electrodes 21; 22A, 22B which is globally perpendicular to the plane of the electrodes.

The variable refractive index of the material 10 is varied from the first refractive index value n1 of the material 10 in the absence of the electric field created between the electrodes 21; 22A, 22B, that is to say, when the electrodes 21; 22A, 22B are not powered, to the minimum refractive index value n2min of the material 10 when the electric field created between the electrodes 21; 22A, 22B is sufficient to align all the mesogenic compounds of the material 10 sandwiched between the electrodes 21; 22A, 22B, and when the common direction D along which the mesogenic compounds 101 of said liquid crystal mix align under the effect of said electric field is parallel to the direction of incidence of said incident light beam.

For an incident light beam parallel to the electromagnetic field, that is to say perpendicular to the plane of the electrodes 21; 22A, 22B, depending on the value of the electric field, which depends on the voltage difference between the electrodes 21; 22A, 22B, any refractive index value between n1 and n2min may be reached for the material 10. The global refractive index of the optical article 1; 2 is varied as a consequence.

Thus, the material 10 can be activated by an operator by means of the electrodes 21; 22A, 22B.

Advantageously, the global variable refractive index of the optical article 1; 2 may be varied even when a thin layer of material 10 is sandwiched between the electrodes 21; 22A, 22B.

This is particularly interesting as the material 10 can get into its activated state with a smaller voltage when the thickness e1, e2 of material 10 is thinner.

The way of use of said optical article 1; 2 is described here under.

In the first embodiment of the optical article 1, the third refractive index value n3 of the Fresnel lens over which the material 10 is formed is chosen to be equal to said minimum n2min of the second refractive index value n2 of the material 10.

Thus, in said first embodiment of the optical article 1, when said material 10 is activated and exhibits its minimum refractive index value n2min, the Fresnel lens 30 becomes invisible for this light beam hitting the optical article 1. That is to say that the Fresnel lens 30 does not give any effect as, at the interface existing between said Fresnel lens 30 and said material 10, there is no difference in refractive indexes.

When the electric field stops, the material 10 reaches its "relaxed state" again, that is to say that the liquid crystal mix is in blue phase. In this case, for a given incident light beam, the Fresnel lens 30 and the material 10 respectively exhibits the third refractive index value n3 and the first refractive index value n1, that are different from each other. Thus, the Fresnel lens 30 operates, and a light beam hitting the optical article 1 will be influenced both by said Fresnel lens 30 and by the material 10.

In the second embodiment of the optical article 2, some portions of the material 10 can be selectively activated, thanks to the different electrode elements 23.

For instance, in said second embodiment of the optical article 2, two consecutive portions of the material 10 can be activated with two different second refractive index values n2 when the two consecutive electrode elements 23 sandwiching them against the electrode 22A, 22B are powered with a different voltage.

Also, in the second embodiment of the optical article 2, some portions of the material 10 can be activated, when the others remain in a relaxed state.

The material 10 is thus called pixelated. Indeed, some portions—called "pixels"—of the optical article 2 may exhibit a second refractive index value n2, some others may exhibit another second refractive index value n2', and some others may exhibit a first refractive index value n1. In this case, a light beam hitting the optical article 2 will be influenced by said material 10 in a way on one pixel, and in another way on another pixel.

Such optical article 1; 2 finds some interesting applications when used as a variable reflective filter, or as an optical lens of great variable focal distance.

Example

The following example illustrates the invention. Of course, the invention is not limited to this example.

The chemical composition used to obtain the material 10 comprises the mesogenic system described in table 3 and the chemical photo-initiator system described in table 4.

In table 3, the composition of the mesogenic system is given in weight compared to the total weight of said mesogenic system.

All the chiral dopants used here are in right handed configuration.

TABLE 3

| Mesogenic system | N° in table 1 or Name | Composition (%) |
|---|---|---|
| Mesogenic compounds | 1 | 3.76 |
| | 2 | 4.16 |
| | 3 | 3.76 |
| | 4 | 4.45 |
| | 5 | 3.12 |
| | 6 | 4.25 |
| | 7 | 4.40 |
| | 8 | 13.45 |
| | 9 | 14.55 |
| | 10 | 12 |
| | 11 | 11 |
| Chiral dopants | R-5011 | 2.67 |
| | R-1011 | 5.43 |
| | CB-15 | 0.9 |
| Monomers | RM-257 | 6.80 |
| | EHA | 5.30 |

The mesogenic system exhibits naturally an unstable blue phase 100 between 45° C. and 51° C.

In table 4, the composition of the chemical photo-initiator system is given in weight compared to the total weight of the chemical composition.

TABLE 4

| Chemical photo-initiator system | Composition (%) |
|---|---|
| 2,4-bis julolidenyl cyclopentanone | 0.01 |
| 2,2',4-Tris(2-chlorophenyl)-5-(3,4-dimethoxyphenyl)-,4',5'-diphenyl-1,1'-biimidazole | 0.4 |
| Mercapto benzoxazole | 0.25 |

The chemical composition is then illuminated with a LED exhibiting a wavelength of approximately 460 nm, at a temperature of 46° C. for 10 minutes. This illumination triggers the polymerization of the monomers comprised in the mesogenic system.

Indeed, during this illumination, the 2,4-bis julolidenyl cyclopentanone, initially of red color, absorbs a part of the energy conveyed by the LED beam, and transfers this energy to the 2,2',4-Tris(2-chlorophenyl)-5-(3,4-dimethoxyphenyl)-,4',5'-diphenyl-1,1'-biimidazole. By doing so, the 2,4-bis julolidenyl cyclopentanone looses its initial red color and becomes colorless, in other words it "photo-bleaches".

The 2,2',4-Tris(2-chlorophenyl)-5-(3,4-dimethoxyphenyl)-,4',5'-diphenyl-1,1-biimidazole, thanks to the energy collected from the 2,4-bis julolidenyl cyclopentanone, triggers the radical polymerization of the monomers.

The mercapto benzoxazole helps accelerating the polymerization of the monomers.

After 10 minutes, the material 10 is obtained.

The material 10 obtained exhibits a stabilized blue phase 100 on the range of temperatures extending from −20° C. to 61° C.

A layer of 4 μm of said material 10 is then placed in between two plain electrodes of indium-tin-oxide powered by a voltage generator to make an optical article according to the invention.

It is then possible to determine the value of the first refractive index n1 of the optical article 1, with an Abbe refractometer.

The ability of this optical article 1 to deflect a light beam was studied.

To illustrate the interest of the invention, the phase shift of a given incident light beam going through this optical article 1 was measured at ambient temperature, that is to say between 18° C. and 25° C., as a function of the voltage generated between said electrodes (FIG. 5).

Here, the phase shift represents the difference between the phase of a light beam exiting the optical article 1 in which the material 10 is in its relaxed state, and the phase of the same light beam exiting the optical article 1 in which the material 10 is in an activated state.

In other words, the phase shift represents the difference between the phase of a light beam exiting the optical article 1 in which the material 10 comprises the liquid crystal mix in blue phase, and the phase of the same light beam exiting the optical article 1 in which the material 10 comprises the liquid crystal mix in transition to the electromagnetically orientated phase.

For such study, a Mach-Zehnder interferometer was used in order to measure the phase modulation achieved by the liquid crystal blue phase stabilized material.

Some interference fringes were obtained with the Mach-Zehnder interferometer. Said interference fringes moved when the voltage applied to the material 10 changed, that is to say when the liquid crystal mix evolved from blue phase to electromagnetically orientated phase. Said move was captured with a CMOS image sensor in a camera. Then, based upon the shift in the interference fringes recorded, the phase modulation that really occurred was determined through calculation. Here, the measurement was realized with a laser at 532 nm.

By measuring such phase shift and by knowing precisely the thickness of the material 10 and the wavelength of the incident light beam, it is possible to calculate the value of the refractive index difference Δn exhibited by the material 10.

On FIG. 5, it is clear that the phase of the incident light beam changes by going through said optical article when a voltage is applied between said electrodes. This proves that the global refractive index of the optical article observed when the material is in its activated state is different from the global refractive index observed when the material is in its relaxed state.

Moreover, it can be seen on FIG. 5 that the more the voltage increases, the more the phase shift increases. This proves that the global refractive index of this optical article varies with the voltage; that is to say with the magnitude of the electromagnetic field. More precisely, the global refractive index decreases with the voltage applied to the electrodes.

When the phase shift curve reaches saturation (not represented on FIG. 5), the optical article analyzed in the Mach-Zehnder interferometer comprises the liquid crystal mix in fully electromagnetically orientated phase, without anymore variation even upon an increase of the electromagnetic field. From this point, even when the voltage increases, the phase shift stays the same.

With this maximal phase shift, it is possible to calculate the maximal value of the refractive index difference Δnmax.

As a consequence, said optical article does exhibit a global variable refractive index that depends on the voltage applied to the electrodes of this optical article.

This proves that using the invention, the liquid crystal mix can be used to form a functional blue-phase controllable optical-phase modulator, independent from polarization, at ambient temperature. In comparison, without using the invention the blue phase of the liquid crystal mix is only stable in a temperature range comprised between 45° C. and 51° C.

The invention claimed is:

1. A method for obtaining a material comprising mesogenic compounds forming a liquid crystal mix with a stabilized blue phase, the method comprising:
   inducing the liquid crystal mix, contained in a chemical composition, to form the blue phase; then
   illuminating the chemical composition with a light beam of visible wavelength in order to trigger the polymerization of monomers contained in the chemical composition, to obtain the material comprising the liquid crystal mix in the blue phase stabilized by the polymerized monomers,
   wherein:
   the chemical composition comprises a mesogenic system and a chemical photo-initiator system;
   the mesogenic system comprises
      the mesogenic compounds forming the liquid crystal mix,
      a chiral dopant adapted to induce the blue phase, and
      a monomer mix comprising the monomers adapted to polymerize; and
   the chemical photo-initiator system is adapted to trigger the polymerization of the monomers when illuminated by the light beam of visible wavelength,
   and wherein the mesogenic compounds are selected so that a difference (Δn) between a second refractive index value (n2) and a first refractive index value (n1) is greater than or equal to 0.1,
   wherein the material exhibits the first refractive index value (n1) for an incident light beam when the liquid crystal mix is in the stabilized blue phase, and exhibits the second refractive index value (n2) for the incident light beam when the mesogenic compounds of the liquid crystal mix align along a common direction (D) under the effect of an electromagnetic field.

2. The method of claim 1, wherein the selecting of the mesogenic compounds occur so that a difference between a minimum (n2min) of the second refractive index value (n2) and the first refractive index value (n1) is greater than or equal to 0.2, wherein the second refractive index value (n2) of the material reaches the minimum (n2min) when the common direction (D) along which all the mesogenic compounds of the liquid crystal mix align under the effect of the electromagnetic field is parallel to the direction of the incident light beam.

3. The method of claim 1, wherein the chemical photo-initiator system contained in the material) is colorless.

4. The method of claim 3, wherein the chemical photo-initiator system is colored when added to prepare the chemical composition, and photo-bleaches while illuminated with the light beam of visible wavelength to become colorless in the material.

5. The method of claim 1, wherein the mesogenic compounds contained in the mesogenic system are nematic liquid crystals selected from the group consisting of chemical formulas:

FORM-I

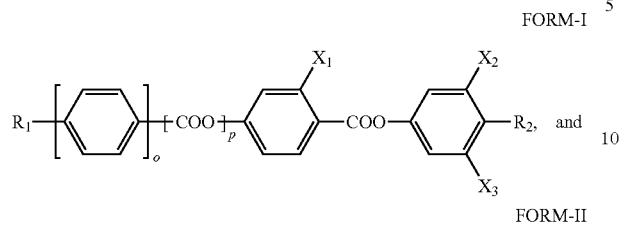

FORM-II

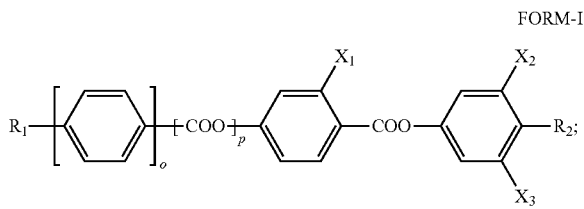

wherein:
R₁ to R₄ are each independently one of the following atoms or groups: H, F, CI, Br, I, CN, NO2, N-chlorosuccinimide, or an alkyl which is a straight chain or a branched chain with 1 to 20 atoms of carbon, and which is unsubstituted, mono- or poly-substituted by F, CI, Br, I or CN;
X₁ to X₉ are each independently one of the following atoms or groups: H, F, CI, Br, I, CN, NO2, N-chlorosuccinimide or an alkyl which is straight chain or branched with 1 to 5 atoms of carbon, and which is unsubstituted, mono- or poly-substituted by F, CI, Br, I or CN; and
o, p, b and d are independent of each other and either 0 or 1.

6. The method of claim 1, wherein the monomer mix comprises:
low molecular weight reactive monomers of formula FORM-III:

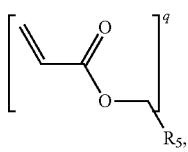

wherein
R₅ is one of the following: an H atom or am alkyl which is a straight or a branched chain with 1 to 20 atoms of carbon, and
q is either 1, 2, or 3; and
high molecular weight reactive monomers, which optionally are mesogenic compounds, of formula FORM-IV:

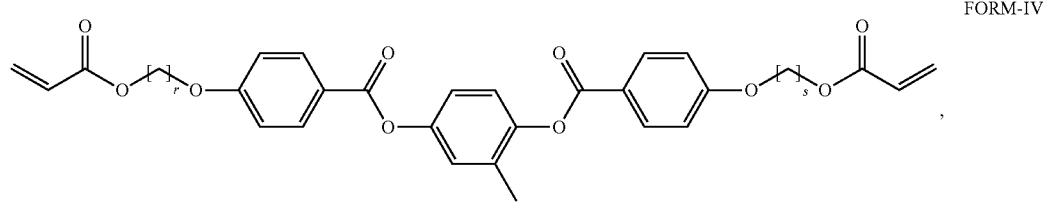

wherein r and s are each independently an integer from 1 to 12.

7. The method of claim 1, wherein the mesogenic system comprises, in weight as compared to the total weight of the mesogenic system:

from 2% to 70% of mesogenic compounds of formula FORM-I:

FORM-I

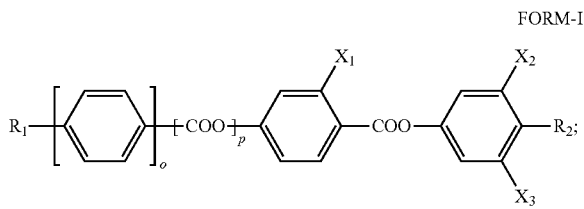

from 2% to 70% of mesogenic compounds of formula FORM-II

FORM-II

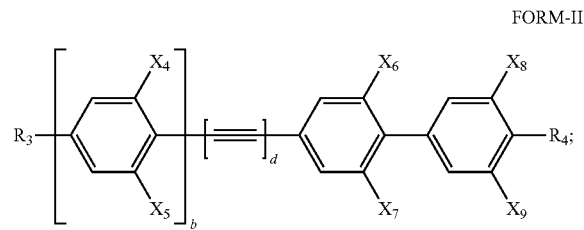

from 0.5% to 35% of low molecular weight reactive monomers of formula FORM-III:

FORM-III

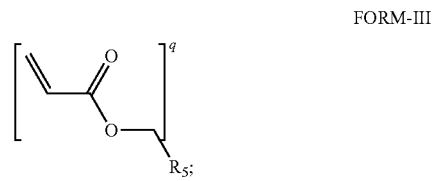

and from 0.5% to 35% of high molecular weight reactive monomers of formula FORM-IV:

FORM-IV

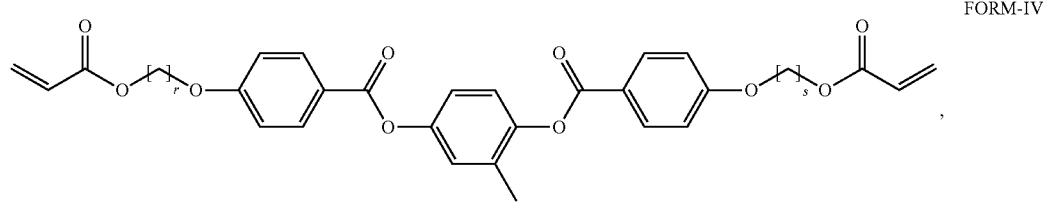

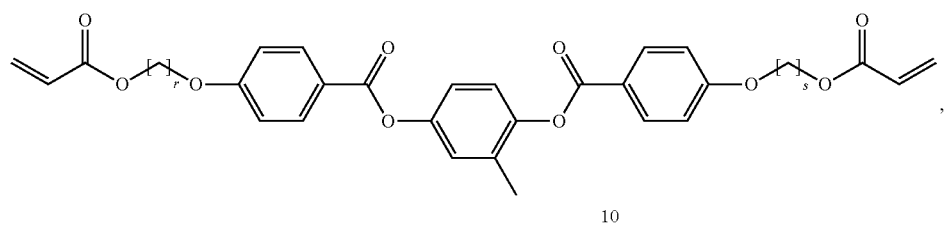

FORM-IV from 1% to 35% of chiral dopants,
wherein:
R$_1$ to R$_4$ are each independently one of the following atoms or groups: H, F, CI, Br, I, CN, NO2, N-chlorosuccinimide, or an alkyl which is a straight chain or a branched chain with 1 to 20 atoms of carbon, and Which is unsubstituted, mono- or poly-substituted by F, CI, Br, I or CN;
X$_1$ to X$_9$ are each independently one of the following atoms or groups: H, F, CI, Br, I, CN, NO2, N-chlorosuccinimide or an alkyl Which is straight chain or branched with 1 to 5 atoms of carbon, and which is unsubstituted, mono- or poly-substituted by F, CI, Br, I or CN;
o, p, b and d are independent of each other and either 0 or 1;
R$_5$ is one of the following: an H atom or an alkyl which is a straight or a branched chain with 1 to 20 atoms of carbon:
q is either 1, 2, or 3; and
r and s are each independently an integer from 1 to 12.

8. The method of claim 1, wherein the chemical photoinitiator system is at least one selected from the group consisting of:
2,4-bis julolidenyl cyclopentanone with 2,2',4-Tris(2-chlorophenyl)-5-(3,4-dimethoxyphenyl)-,4',5'-diphenyl-1,1'-biimidazole and mercapto benzoxazole;
rose Bengal dye and n-phenyl glycine;
erythrosine B with triethanolamine initiator and N, N'-methylenebisacrylamide monomers;
methylene blue and triethanolamine initiator;
methylene blue and p-toluensulfonic acid;
bis(2,4,6-trimethylbenzoyl)-phenylphosphineoxide;
cyanine dye with 5,5'-Dichloro-11-diphenylamino-3,3'-diethyl-10,12-ethylenethiatricarbocyanine perchlorate (IR-140 initiator), with ethyl-di-methyl-amino-benzoate (electron donor) and tetrabromomethane;
dibromofluorescein (xanthene dye) and N-phenylglycine; and
5,7-diiodo-3-butoxy-6-fluorone (H-Nu 470, C$_{17}$H$_{14}$I$_2$O$_3$) with 2,4,5,7-Tetraiodo-3-hydroxy-6-fluorone (H-Nu 535, C$_{13}$H$_3$I$_4$O$_3$) and 2,4,5,7-Tetraiodo-3-hydroxy-9-cyano-6-fluorone (H-Nu 635, C$_{14}$H$_2$I$_4$NO$_3$,) with an amine and an iodonium salt co-initiator.

9. The method of claim 1, wherein the chiral dopant contained in the mesogenic system exhibits at least a cholesteric phase.

10. The method of claim 1, wherein the chiral dopant comprises at least one of the following compounds:
cholesterylnonanoate,
R/S-1011 of formula:

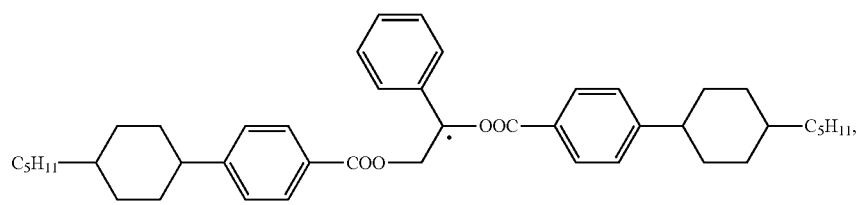

R/S-5011 of formula:

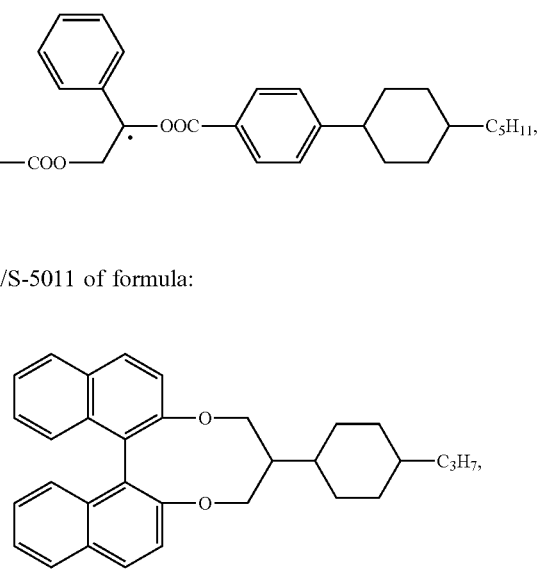

and

CB-15 of formula:

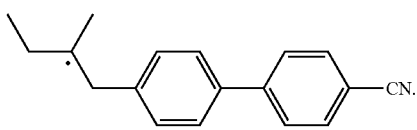

11. An optical article of variable refractive index, comprising the material obtained by the method of claim 1, sandwiched between at least two electrodes connected to a power source adapted to place the material in an electric field.

12. The optical article of claim 11, wherein the material is formed in a predetermined shape to manufacture the optical article.

13. The optical article of claim 11, wherein:
the material is formed over a Fresnel lens to manufacture the optical article;

the material exhibits a minimum of second refractive index value (n2min) for an incident light beam when the mesogenic compounds align along the direction of the incident light beam under the effect of an electromagnetic field generated between the electrodes and the Fresnel lens exhibits a third refractive index value (n3) equal to the minimal second refractive index value (n2min).

14. The optical article of claim 11, wherein at least one of the electrodes comprises a plurality of electrode elements, each of the electrode elements being adapted to be selectively powered in order to place a portion of the material located next to the electrode element in an electric field.

15. The method of claim 1, wherein the mesogenic system comprises:

from 5% to 30% of mesogenic compounds of formula FORM-I:

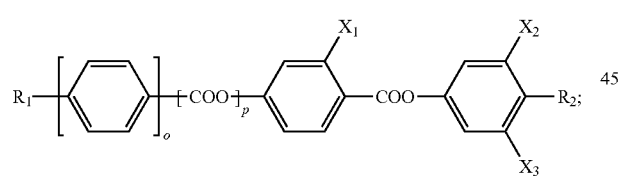

from 2% to 40% of mesogenic compounds of formula FORM-II:

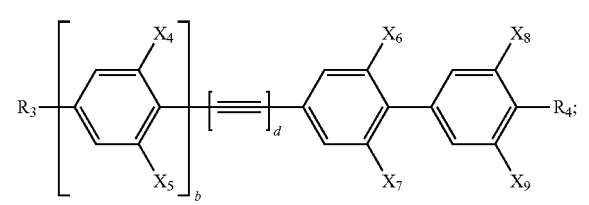

from 0.5% to 15% of low molecular weight reactive monomers of formula FORM-III:

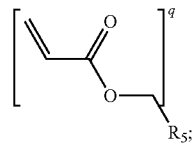

and from (0.5% to 20% of high molecular weight reactive monomers of formula FORM-IV:

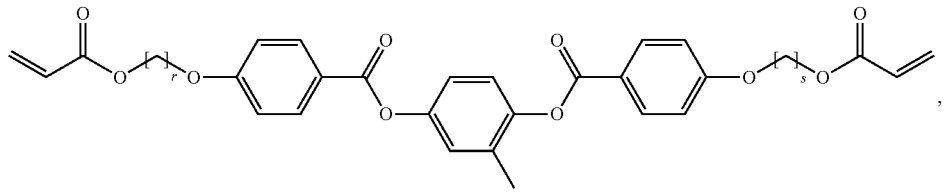

from 1% to 15% of chiral dopants, wherein:

$R_1$ to $R_4$ are each independently one of the following atoms or groups: H, F, CI Br, I, CN, NO2, N-chlorosuccinimide, or an alkyl which is a straight chain or a branched, chain with 1 to 20 atoms of carbon, and which is unsubstituted, mono- or poly-substituted by F, CI, Br, I or CN;

$X_1$ to $X_9$ are each independently one of the following atoms or groups: H, F, CI, Br, I, CN, NO2, N-chlorosuccinimide or an alkyl which is straight chain or branched with 1 to 5 atoms of carbon, and which is unsubstituted, mono- or poly-substituted by F, CI, Br, I or CN;

o, p, b and d are independent of each other and either 0 or 1;

$R_5$ is one of the following: an H atom or an alkyl which is a straight or a branched chain with 1 to 20 atoms of carbon;

q is either 1, 2, or 3; and r and s are each independently an integer from 1 to 12.

* * * * *